United States Patent [19]
Fukushima

[11] Patent Number: 5,625,494
[45] Date of Patent: Apr. 29, 1997

[54] OPTICAL BAND-PASS FILTER HAVING TWO PASS BANDS

[75] Inventor: Nobuhiro Fukushima, Kawasaki, Japan

[73] Assignee: Fujitsu Ltd., Kawasaki, Japan

[21] Appl. No.: 493,290

[22] Filed: Jun. 21, 1995

[30] Foreign Application Priority Data

Sep. 26, 1994 [JP] Japan .................................. 6-229204

[51] Int. Cl.$^6$ .............................. G02B 5/28; G02B 27/14
[52] U.S. Cl. ........................... 359/634; 359/589; 359/629
[58] Field of Search ................................... 359/634, 589, 359/629, 636, 583, 638, 639, 640

[56] References Cited

U.S. PATENT DOCUMENTS

| | | | |
|---|---|---|---|
| 5,245,449 | 9/1993 | Ooi | 359/40 |
| 5,363,455 | 11/1994 | Nishi | 382/31 |

FOREIGN PATENT DOCUMENTS

| | | |
|---|---|---|
| 61-149906 | 7/1986 | Japan . |
| 63-23105 | 1/1988 | Japan . |

*Primary Examiner*—Georgia Y. Epps
*Assistant Examiner*—Ricky Mack
*Attorney, Agent, or Firm*—Armstrong, Westerman Hattori, McCleland & Naughton

[57] ABSTRACT

An optical band-pass filter adapted for enabling mutually independent fine adjustments of two pass bands. The optical band-pass filter comprises a first filter having a first pass band, first and second reflective films for respectively reflecting the transmitted light and the reflected light obtained from the first filter film, and a second filter film having a second pass band different from the first pass band and serving to combine the light out of the first and second reflective films with each other.

4 Claims, Drawing Sheets

OPTICAL BAND-PASS FILTER HAVING TWO PASS BANDS

BACKGROUND OF THE INVENTION

1. Field of the Invention

The present invention relates to an optical bandpass filter having two pass bands.

2. Description of the Related Art

In the field of optical communication for example, an optical filter is used to separate signal light of a specific wavelength from light of any other wavelengths (e.g., noise light). Regarding the conventional optical band-pass filters of this type, there is known an exemplary one where a dielectric multilayer film is laminated on a transparent glass plate. In this case, normally the laminated structure of the film is so set as to have a single pass band.

In wavelength division multiplex communications where a plurality of signal light outputs of mutually different wavelengths are transmitted through multiplexing, there may arise the necessity of employing an optical band-pass filter having two pass bands. Some attempts have been made heretofore to obtain two pass bands by optimizing the laminated structure of a dielectric multilayer film. In this case, however, there exists a problem that it is impossible to set two pass bands independently of each other when setting the pass bands in compliance with variations of the signal light wavelengths. More specifically, since a plurality of multiplexed signal light outputs are incident upon an optical band-pass filter via the same optical path, the other pass band also changes depending on any change of one pass band at the time of fine adjustment of either pass band performed by changing the angle of incidence upon the dielectric multilayer film.

SUMMARY OF THE INVENTION

It is therefore an object of the present invention to provide an optical band-pass filter adapted to realize mutually independent setting of two pass bands.

In accordance with an aspect of the present invention, there is provided an optical band-pass filter which comprises a first filter film capable of transmitting therethrough light of wavelengths within a predetermined first band and outputting a transmitted light to a first optical path while reflecting light of any other wavelengths and outputting a reflected light to a second optical path, first and second reflective films disposed on the first and second optical paths respectively, and a second filter film capable of transmitting therethrough light of wavelengths within a predetermined band different from the first band while reflecting light of any other wavelengths, wherein the second filter film is so positioned that both the reflected component of the light reflected from the first reflective film and incident upon the second filter film and the transmitted component of the light reflected from the second reflective film and incident upon the second filter film are outputted to one and the same optical path.

In the present invention, the first filter film for separating the light of the wave-lengths within the first band and the second filter film for separating the light of the other wavelengths within the second band are provided individually and are connected optically to each other in a specific mode, whereby mutually independent setting of two pass bands is rendered possible.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENT

Figure 1:
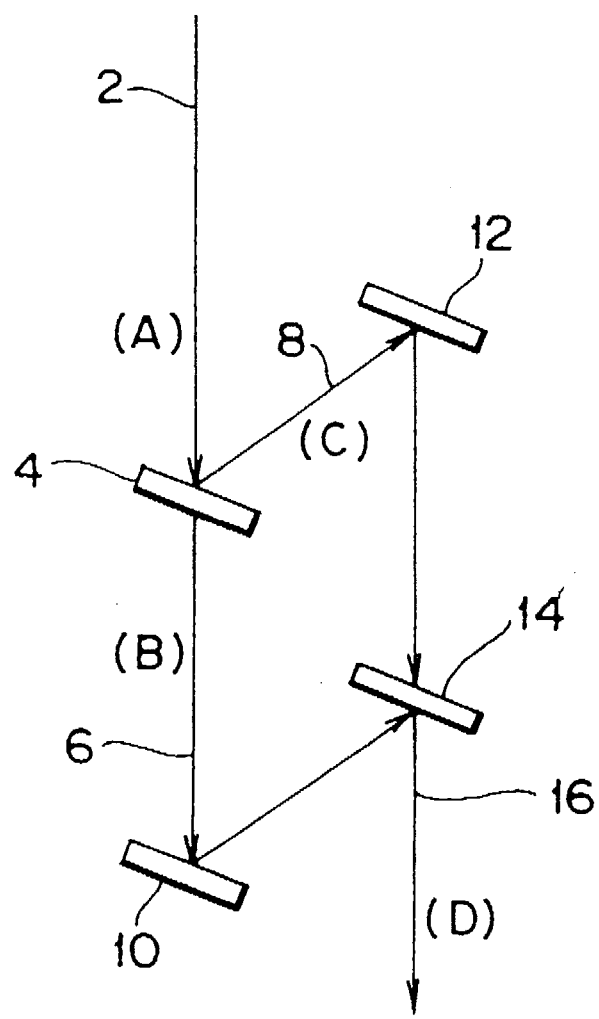
FIG. 1 schematically shows a basic structure of an optical band-pass filter according to the present invention.

Hereinafter a preferred embodiment of the present invention will be described in detail with reference to the accompanying drawings. FIG. 1 schematically shows a basic structure of the optical band-pass filter according to the invention. Reference numeral 2 denotes an optical path of incident light upon the optical band-pass filter. A filter film 4 transmits therethrough light of wavelengths within a predetermined band whose center wavelength is $\lambda_1$, and reflects light of any other wavelengths. A settable range of the pass band of the filter film 4 is 2 nm for example, and its half-value full width is 0.5 nm.

Reference numerals 6 and 8 respectively denote optical paths of the transmitted light and the reflected light obtained from the filter film 4. Reflective films 10 and 12 are disposed on the optical paths 6 and 8 respectively. The light reflected by the film 10 and the light reflected by the film 12 are combined with each other by a filter film 14 and then are outputted to one and the same optical path (denoted by 16). The filter film 14 has a predetermined pass band whose center frequency is $\lambda_2$ ($\lambda_2 \neq \lambda_1$). For simplifying the explanation, it is assumed in this example that the band width thereof is the same as that of the pass band of the filter film 4.

FIGS. 2A to 2D graphically show the wavelength characteristics in the optical paths 2, 6, 8 and 16 illustrated in FIG. 1, respectively. Supposing now that the wavelength characteristic in the optical path 2 of the incident light has a uniform power distribution with respect to wavelengths, the pass band of the filter film 4 is reflected on the wavelength characteristic in the optical path 6 of the transmitted light of the filter film 4. The characteristic in the optical path 8 of the reflected light of the filter film 4 corresponds to the difference between the characteristic of FIG. 2A and that of FIG. 2B.

Figure 2A:
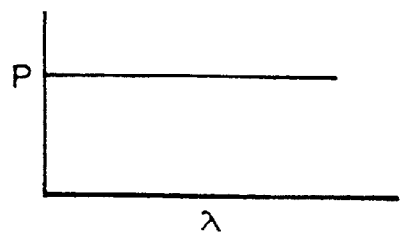
FIGS. 2A to 2D graphically show the wavelength characteristics in the individual optical paths illustrated in FIG. 1.
Figure 2B:
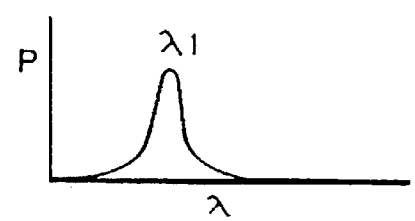
Figure 2C:
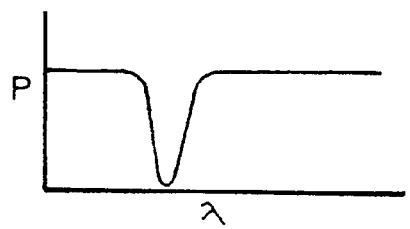
Figure 2D:
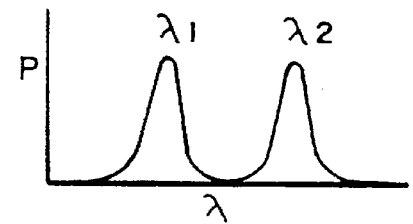

When the light of the characteristic shown in FIG. 2C has been transmitted through the filter film 14, there is extracted only the light within the pass band of the filter film 14 having a center wavelength of $\lambda_2$. Since the pass band of the filter film 4 and that of the filter film 14 are different from each other, the light of the characteristic shown in FIG. 2B is reflected by the filter film 14, so that the wavelength characteristic in the optical path 16 is eventually caused to have two pass bands as shown in FIG. 2D.

According to this embodiment, two mutually independent filter films 4 and 14 are used for separating the first-band light of a center wavelength $\lambda_1$ and the second-band light of a center wavelength $\lambda_2$ from each other, whereby it is rendered possible to independently set the two bands. More specifically, fine adjustment of the first band is performed by slightly changing the incident angle on the filter film 4. Meanwhile, the second band is set by changing the incident angle on the filter film 14. In changing the incident angles relative to the filter films 4 and/or 14, the positions of the individual component elements are so set that the transmitted light and the reflected light from the filter film 14 are outputted to one and the same optical path.

Figure 3A:
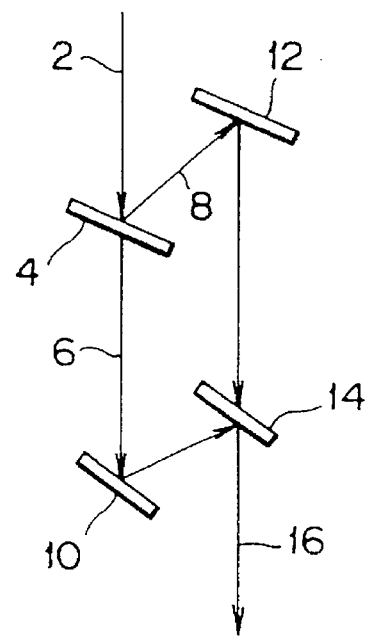
FIGS. 3A and 3B illustrate the relationship between an incident beam and an output beam.
Figure 3B:
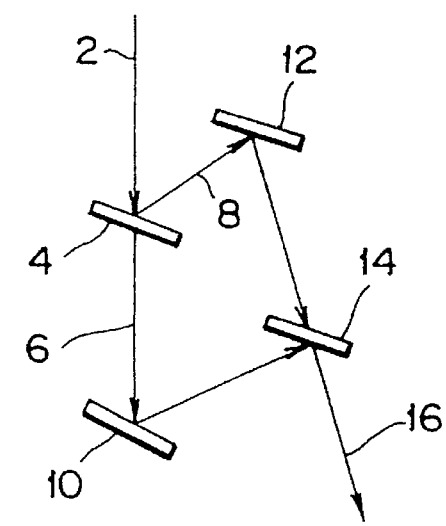

In the arrangement of FIG. 3A where the incident angle on the filter film 4 is equal to that on the reflective film 12 and also the incident angle on the reflective film 10 is equal to that on the filter film 14, the incident beam (optical path 2) and the output beam (optical path 16) relative to the optical band-pass filter can be rendered parallel to each other to consequently attain remarkable significance in practical use. This condition is not exactly requisite, however, and therefore, as illustrated in FIG. 3B, the incident beam (optical path 2) and the output beam (optical path 16) need not be parallel to each other.

Figure 4:
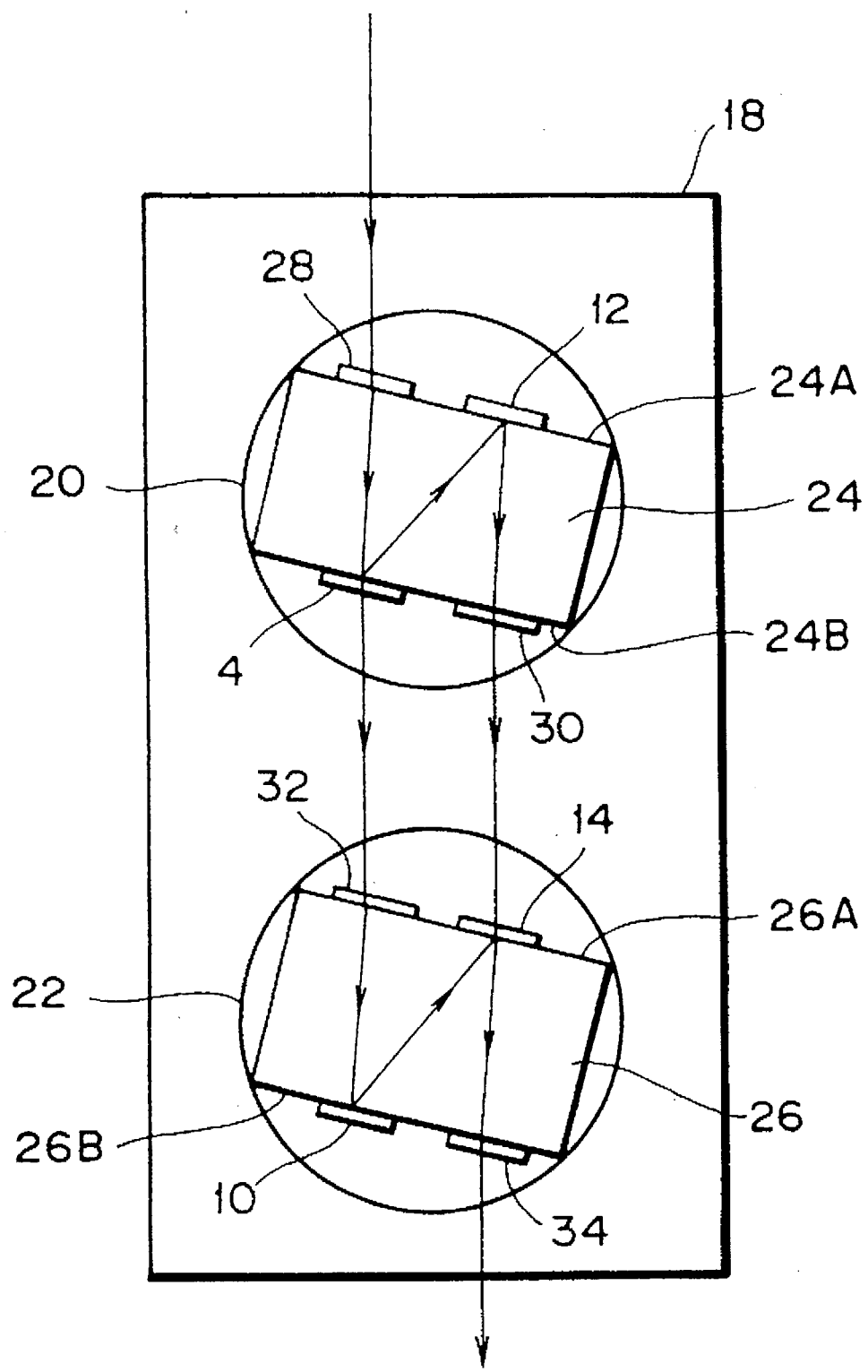
FIG. 4 is a plan view of an optical band-pass filter representing an embodiment of the present invention.

FIG. 4 is a plan view of an optical band-pass filter representing an embodiment of the present invention. Glass plates 24 and 26 are disposed on a substrate 18 via rotary tables 20 and 22 respectively in such a manner as to be rotatable independently of each other. The glass plate 24 has a first plane 24A and a second plane 24B which are mutually parallel, while the glass plate 26 has a third plane 26A and a fourth plane 26B which are also mutually parallel. The second plane 24B and the third plane 26A are so disposed as to be opposite to each other.

In an arrangement where the two glass plates 24 and 26 are thus positioned, the basic structure of FIG. 1 can be realized with facility. More specifically, the reflective film 12, the filter film 4, the filter film 14 and the reflective film 10 shown in FIG. 1 are formed by lamination of a dielectric multilayer film on each of the first plane 24A and the second plane 24B of the glass plate 24, and also on each of the third plane 26A and the fourth plane 26B of the glass plate 26. In order to reduce the reflection loss derived from the direct transmission of the light through each plane of the glass plates, antireflection films (AR films) 28, 30, 32 and 34 are formed on the first plane 24A, the second plane 24B, the third plane 26A and the fourth plane 26B, respectively.

According to this embodiment, the incident angle upon the filter film 4 can be changed by rotating the glass plate 24 to the substrate 18. Similarly, the incident angle upon the filter film 14 can be changed by rotating the glass plate 26 to the substrate 18. It is therefore easy to perform fine adjustment of the pass band of each filter film. Relative to such fine adjustment of the pass band, the position of transmission or reflection of the light in each film is slightly varied in accordance with the rotation of the glass plate, and consequently it is desired that the dimensions of each film be so set as to permit such positional variation.

As described hereinabove, the present invention brings about advantageous effect of providing an optical band-pass filter adapted to realize mutually independent fine adjustments of two pass bands.

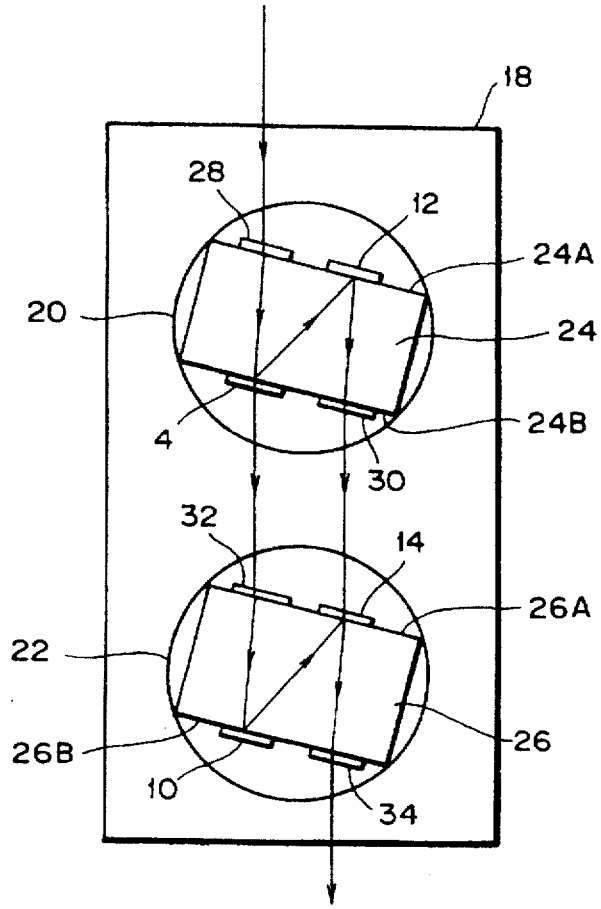

What is claimed is:

1. An optical band-pass filter comprising:
    a first filter film transmitting there-through light of wavelengths within a predetermined first band and outputting a transmitted light to a first optical path, while reflecting light of any other wavelengths and outputting a reflected light to a second optical path;
    a first reflective film disposed on said first optical path;
    a second reflective film disposed on said second optical path;
    a second filter film transmitting therethrough light of wavelengths within a predetermined band different from said first band while reflecting light of any other wavelengths, said second filter film being so positioned that a reflected component of the light reflected from said first reflective film and incident upon said second filter film and a transmitted component of the light reflected from said second reflective film and incident upon said second filter film are outputted to one and the same optical path; and
    a first glass plate having a first plane and a second plane parallel to each other, and a second glass plate having a third plane and a fourth plane parallel to each other, said second plane being opposite to said third plane;
    wherein said first filter film is disposed on said second plane; said second filter film is disposed on said third plane; said first reflective film is disposed on said fourth plane; and said second reflective film is disposed on said first plane.

2. The optical band-pass filter according to claim 1, wherein an incident angle upon said first filter film is equal to an incident angle upon said second reflective film, and an incident angle upon said second filter film is equal to an incident angle upon said first reflective film.

3. The optical band-pass filter according to claim 1, wherein said first and second glass plates are so provided as to be rotatable independently of each other.

4. The optical band-pass filter according to claim 1, wherein each of said first and second filter films is composed of a dielectric multilayer film.

* * * * *

UNITED STATES PATENT AND TRADEMARK OFFICE
CERTIFICATE OF CORRECTION

PATENT : 5,625,494

DATED : April 29, 1997

INVENTOR(S) : Nobuhiro Fukushima

It is certified that error appears in the above-identified patent and that said Letters Patent is hereby corrected as shown below:

The title page should be deleted and substitute therefor the attached title page.

Signed and Sealed this

Twenty-third Day of September, 1997

*Attest:*

BRUCE LEHMAN

*Attesting Officer*  *Commissioner of Patents and Trademarks*

United States Patent [19]
Fukushima

[11] Patent Number: 5,625,494
[45] Date of Patent: Apr. 29, 1997

[54] OPTICAL BAND-PASS FILTER HAVING TWO PASS BANDS

[75] Inventor: Nobuhiro Fukushima, Kawasaki, Japan

[73] Assignee: Fujitsu Ltd., Kawasaki, Japan

[21] Appl. No.: 493,290

[22] Filed: Jun. 21, 1995

[30] Foreign Application Priority Data

Sep. 26, 1994 [JP] Japan .................. 6-229204

[51] Int. Cl.$^6$ .................. G02B 5/28; G02B 27/14
[52] U.S. Cl. .................. 359/634; 359/589; 359/629
[58] Field of Search .................. 359/634, 589, 359/629, 636, 583, 638, 639, 640

[56] References Cited

U.S. PATENT DOCUMENTS

| | | | |
|---|---|---|---|
| 5,245,449 | 9/1993 | Ooi | 359/40 |
| 5,363,455 | 11/1994 | Nishi | 382/31 |

FOREIGN PATENT DOCUMENTS

| | | |
|---|---|---|
| 61-149906 | 7/1986 | Japan . |
| 63-23105 | 1/1988 | Japan . |

*Primary Examiner*—Georgia Y. Epps
*Assistant Examiner*—Ricky Mack
*Attorney, Agent, or Firm*—Armstrong, Westerman Hattori, McCleland & Naughton

[57] ABSTRACT

An optical band-pass filter adapted for enabling mutually independent fine adjustments of two pass bands. The optical band-pass filter comprises a first filter having a first pass band, first and second reflective films for respectively reflecting the transmitted light and the reflected light obtained from the first filter film, and a second filter film having a second pass band different from the first pass band and serving to combine the light out of the first and second reflective films with each other.

4 Claims, 4 Drawing Sheets